United States Patent [19]
Streib

[11] Patent Number: 5,460,580
[45] Date of Patent: Oct. 24, 1995

[54] METHOD AND ARRANGEMENT FOR CONTROLLING THE DRIVE POWER OF A DRIVE UNIT OF A MOTOR VEHICLE

[75] Inventor: Martin Streib, Vaihingen/Enz, Germany

[73] Assignee: Robert Bosch GmbH, Stuttgart, Germany

[21] Appl. No.: 241,747

[22] Filed: May 12, 1994

[30] Foreign Application Priority Data

May 12, 1993 [DE]  Germany ........................ 43 15 843.9

[51] Int. Cl.⁶ ................................................. B60K 41/04
[52] U.S. Cl. ............................................. 477/110; 477/114
[58] Field of Search ................................. 477/107, 110, 477/114

[56] References Cited

U.S. PATENT DOCUMENTS 3,890,856  6/1975  Miyauchi et al. .
4,513,639  4/1985  Hiramatsu ............................. 477/114
4,526,065  7/1985  Rosen et al. .......................... 477/114
4,561,328  12/1985 Hiramatsu ............................. 477/114
4,774,938  10/1988 Hiramatsu ............................. 477/114
4,850,251  7/1989  Kuwayama et al. .................. 477/114
4,885,960  12/1989 Maeda et al. ......................... 477/114
5,119,694  6/1992  Sato et al. .

*Primary Examiner*—Dirk Wright
*Attorney, Agent, or Firm*—Walter Ottesen

[57] ABSTRACT

The invention is directed to a method and an arrangement for controlling the drive power of a motor vehicle wherein a controllable transmission unit is acted upon in such a manner that the load of the drive unit is at least reduced for the operating state of the motor vehicle wherein the vehicle is at standstill and/or is rolling slowly. When leaving this operating state, the control of the drive power is delayed until the complete force connection is reestablished.

14 Claims, 4 Drawing Sheets

METHOD AND ARRANGEMENT FOR CONTROLLING THE DRIVE POWER OF A DRIVE UNIT OF A MOTOR VEHICLE

BACKGROUND OF THE INVENTION

In motor vehicles equipped with an automatic transmission, the driver must actuate the brakes in order to prevent a creeping of the motor vehicle when the vehicle is at standstill and a gear is engaged. This situation is present because of the torque converter. This leads to the situation that the drive unit of the motor vehicle must maintain its idle rpm in opposition to a brake torque of the torque converter. This, in turn, means that for a motor vehicle at standstill and with a gear engaged, the motor must operate at a higher load than would be necessary in the neutral position with the force connection interrupted. For the case where the drive unit is an internal combustion engine, an unnecessarily high consumption of fuel for a motor vehicle at standstill results because of the foregoing.

SUMMARY OF THE INVENTION

In view of the above, it is an object of the invention to provide measures with which the consumption of fuel can be reduced when the motor vehicle is at standstill and to provide a comfortable transition from standstill into the driving mode of operation.

For a motor vehicle at standstill or only rolling slowly, the above is achieved in that the transmission ratio in the drive train is adjusted in the sense of a reduction of the braking torque acting on the drive unit or the load of the drive unit, for example, by shifting the transmission into the neutral mode. For the transfer into the driving mode, the drive power of the motor vehicle is only adjusted after reestablishing the original transmission ratio in correspondence to the driver command.

In this context, it is known from U.S. Pat. 3,890,856 and 5,119,694 to shift the automatic transmission automatically into the neutral position, even if the driver has set the automatic transmission into a drive position, in order to reduce the tendency of motor vehicles with automatic transmission to creep when at standstill or rolling slowly or to shift into a gear higher than that engaged by the driver.

The invention affords the advantage that the consumption of fuel is reduced for standing and/or slowly rolling motor vehicles, for example, by reducing the idle rpm and that the transition into the driving mode is configured so as to be comfortable.

It is especially advantageous to prevent a runup of the motor during the transition into the driving mode when the driver suddenly supplies fuel.

It is especially advantageous that the slip in the clutches of the transmission is reduced by delaying the control of the drive power of the motor vehicle. In this way, wear in the transmission is reduced. This leads to a protection of the mechanical components of the transmission.

Furthermore, the condition is avoided that the motor vehicle is set into motion with a jolt when the transition into the driving mode of operation takes place.

It is especially advantageous that after the gear desired by the driver is engaged, a time span is pregiven after which the drive power is increased.

It is especially advantageous that the increase of the drive power is carried out via a pregiven ramp function to the value pregiven by the driver so that a smooth transition is ensured in the movement of the vehicle from standstill.

The use of a signal indicating the force connection in the transmission is advantageous.

The use of an electrical control of the throttle flap of the internal combustion engine is especially advantageous with the position of the throttle flap being indicative of the drive power.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
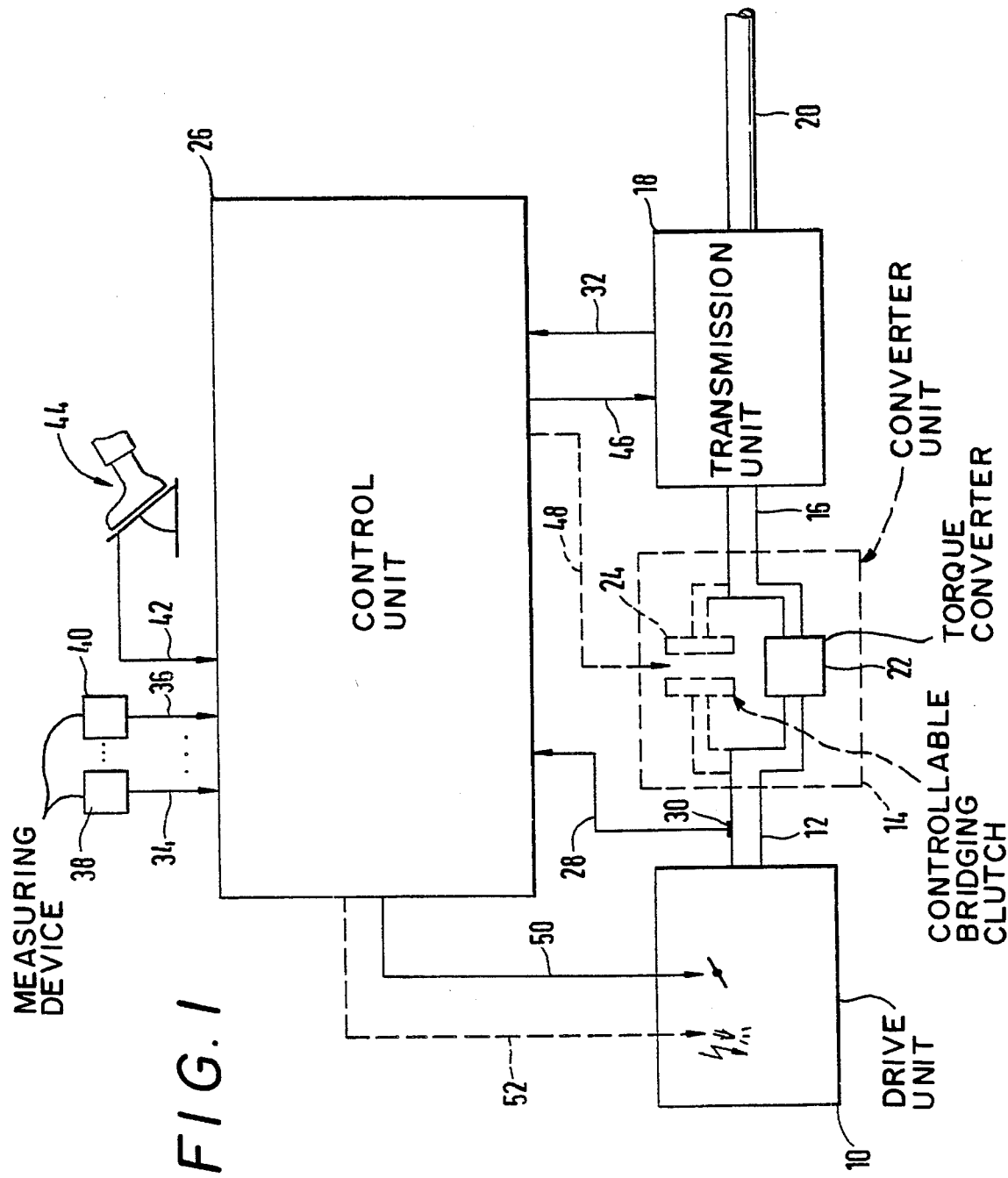
FIG. 1 is an overview block circuit diagram of a control configuration incorporating the arrangement according to the invention with the configuration shown being for the drive train of a motor vehicle.

FIG. 1 schematically shows the drive train of a motor vehicle. Reference numeral 10 identifies the drive unit which is preferably an internal combustion engine having an output shaft 12 (the crankshaft) which leads to a converter unit 14 of an automatic transmission. The output shaft 16 (the turbine shaft) of the converter unit 14 is connected to the transmission unit 18 having output shaft 20 which defines the output shaft of the drive train. The converter unit 14 comprises a torque converter 22 and, in a preferred embodiment, a controllable bridging clutch 24.

In addition, a control unit 26 is provided to which a first line 28 is connected from a measuring device 30 for detecting the rpm of the crankshaft 12. A second input line 32 connects the transmission unit 18 to the control unit 26. Additional input lines 34 to 36 connect measuring devices 38 to 40, respectively, for detecting additional operating variables of the drive unit, the drive train and/or the motor vehicle. An input line 42 connects the operator-controllable element 44 to the control unit 26. The element 44 is preferably an accelerator pedal actuated by the driver. For control purposes, a first output line 46 connects the control unit 26 to the transmission unit 18 and, in a preferred embodiment, an output line 48 connects the control unit 26 to the converter clutch 24 for controlling the latter. An output line 50 and/or output lines 52 are provided for controlling the drive power of the drive unit 10.

In a preferred embodiment, the drive unit 10 defines an internal combustion engine. The power of the engine is controlled via an electrically actuable power output element for influencing the supply of air to the engine. For this reason, the control unit 26 includes, in a preferred embodiment, an electronic motor power control which undertakes setting the power output element (for example, a throttle flap) via an electrical path on the basis of the driver command. Furthermore, the control unit 26 can include means for controlling the metering of fuel and the ignition time point, which are influenced, in other advantageous embodiments, in addition to or in lieu of the air supply for controlling the drive power.

If the connection between the accelerator pedal and the throttle flap is mechanical and cannot be acted upon electrically, then an electrically actuable ancillary flap can be provided as part of the arrangement of the invention. This ancillary flap is in the completely open position in the unactuated state. Furthermore, the power can be controlled with an air bypass valve which is conventionally utilized for controlling idle.

The arrangement according to the invention can be utilized in combination with a diesel engine in addition to the preferred embodiment of a spark-ignition engine. For the diesel engine, the metered fuel quantity is the operating parameter to be acted upon for controlling the power of the engine. As a rule, the fuel quantity is adjusted on the basis of the driver command via an electronic diesel control.

Furthermore, the method and arrangement of the invention are also advantageously applicable in combination with alternate drive concepts such as an electric motor.

The control unit 26 is provided for controlling the drive power of the motor and for controlling the transmission system. This can be carried out independently of each other in two different control apparatus or computer elements; however, it can also take place in the context of a common drive train control with all functions being executed in the context of one computer element or in the context of several computer elements which are connected to each other via a communication system.

The transmission system can be any one of the following: an automatic stepped transmission having a torque converter, an automatic stepped transmission having a torque converter and a bridging clutch which can also be configured so as to be controllable or a transmission having a ratio which is continuously adjustable.

The operating variables necessary to carry out the control in the context of the method and arrangement of the invention are supplied to the control unit 26 via the above-mentioned input lines. The rpm of the drive unit 10 is supplied via the line 28 and the particular transmission gear engaged is supplied via the line 32. The position of an operator-controlled element, which here is an accelerator pedal actuable by the driver, is supplied via line 42. Operating variables are supplied via lines 34 to 36 such as the position of the brake pedal, the road speed (rpm of the output shaft 20), the position of the transmission selection lever, if required, a signal which defines the completed force connection in the drive train as well as the operating variables required for controlling the drive unit such as throttle flap position, air supply, exhaust gas composition, et cetera.

The operation of the configuration of FIG. 1 in the context of the method and arrangement of the invention will now be described. The control unit 26 controls the drive power of the motor as well as the transmission ratio in the drive train in dependence upon the operating variables supplied to the control unit. For example, the transmission unit 18 is controlled in accordance with a pregiven gear-shifting program on the basis of the motor rpm and motor load. The change of gears is realized by controlling the clutches. For this purpose, the pressures in the clutches are changed by the control unit 26, for example, in accordance with pregiven ramp functions. To improve comfort, in preferred embodiments, the torque converter in the automatic transmission can be bridged by a controllable converter clutch which can be opened or closed in pregiven operating states or a control to a pregiven slip can be carried out. For controlling the drive power of the motor 10, in an electronic motor power control, the control unit 26 detects the driver command on the basis of the degree of actuation of the accelerator pedal. From this, and, if required, by considering the transmission ratio which has been set, the torque component for compensating for losses in the drive train as well as the torque component for compensating the requirement of ancillary consumers, a desired value is formed for adjusting the drive power, that is, the throttle flap of the engine. The throttle flap is controlled by means of a position control to this desired value. On the basis of the air quantity supplied as well as the engine rpm, fuel metering is adjusted in view of the composition of the exhaust gas; whereas, the ignition time point is adjusted on the basis of the engine rpm and engine load as well as, if required, is determined by the motor torque commanded by the driver.

To improve the driving performance of the motor vehicle, an embodiment of the invention provides that the control unit 26 operates on the transmission unit 18 independently of the selector lever in such a manner that, for a motor vehicle at standstill or rolling slowly, the force connection between the drive unit and the output shaft is interrupted. In this way, for a motor vehicle at standstill or slightly rolling, the drive unit does not have to develop any power to overcome the brake torque of the torque converter 22 and this brake torque increases with decreasing speed. This leads to a reduction of the consumption of fuel. In lieu of the neutral position of the transmission unit 18, it can be advantageous to engage a higher gear (for example, fourth, fifth) in lieu of the first gear. In this way, and as a consequence of the higher transmission ratio in the drive chain, the tendency of the motor vehicle to creep is reduced so that the driver must brake with less intensity to assure the standstill of the motor vehicle. Furthermore, the motor rpm can be reduced so that the consumption of fuel drops.

A motor vehicle which is at standstill or rolls slowly is detected especially on the basis of the released accelerator pedal as well as the actuated brake or on the basis of the released accelerator pedal and a road speed lying below a pregiven threshold value (for example, 10 km/h).

If the driver actuates the accelerator pedal in order to accelerate the motor vehicle from standstill or from the operating state wherein the motor vehicle is slowly rolling, the above-described transmission shift must be reversed and the gear engaged in advance of the above-described operating phase must be engaged again. This is effected by a corresponding control of the pressure in the clutches and requires a time interval to be effective which results from the ramp control of the clutch pressure. This means that when the driver steps rapidly onto the accelerator pedal, a motor torque is already built up by means of the electronic motor power control via the setting of the drive power, that is the setting of the throttle flap, before the force connection in the transmission is again completely reestablished. The consequence thereof is an unwanted runup of the motor, a jolt-like movement of the motor vehicle when the force connection is reestablished as well as increase in the wear in the transmission on the clutches since the runup of the motor drives the clutch components at the motor end.

A comparable situation occurs when the driver shifts the transmission (in standstill or when the motor vehicle is rolling slowly) manually into the neutral position in order to save fuel and to reduce the tendency to creep. With a rapid actuation of the accelerator pedal when engaging the drive position, the above-described unwanted motor behavior can likewise occur.

For this reason, the invention provides for delaying the execution of the command of the driver until the force connection in the transmission is again completely reestablished. This can take place in that a pregiven delay time for changing the throttle flap position is provided which is derived on the basis of the time needed to reestablish the force connection in the transmission. When this time has elapsed, the throttle flap can be opened, for example, in accordance with a pregiven time-dependent ramp function in response to the position pregiven by the driver. In this way, the following results: a smooth movement of the automobile, no unwanted runup of the engine and a reduction of the wear in the transmission clutches.

In addition to the pregiven time delay, a signal can be tapped from the transmission unit 18 which signals that the force connection is complete. With respect to this time delay, the pregiven minimum time for the clutch control is considered as well as the dead time associated with setting the throttle flap and increasing the motor power and the control of the converter clutch, as may be required. The signal can be determined, for example, on the basis of the controlled clutch pressure or on the basis of a comparison of the rpm of the output shaft and the rpm of the turbine shaft (or the motor rpm). The driver command in the sense of an increase of the motor power is then only carried out when the force connection is again reestablished.

A corresponding procedure results in a second preferred embodiment wherein (with the motor vehicle at standstill or slowly rolling) the transmission unit is shifted into a higher gear. When driving away from standstill, a downshift into the first gear takes place with a time delay being pregiven for controlling the drive power or a signal from the transmission control is awaited.

If the motor vehicle does not include an electronic adjustment of the throttle flap, then a corresponding control via an ancillary flap connected in series with the main throttle flap to influence the supply of air can be of assistance, as is known, for example, from drive slip control systems. If the driver actuates the accelerator pedal, the throttle flap is immediately opened because of the mechanical connection in this conventional system; that is, the motor torque increases. The ancillary flap can be electrically closed for a pregiven time up to a pregiven value which compensates for the influence of the driver entirely or at least partially and, after the pregiven time has elapsed, the ancillary flap can be driven back according to a pregiven time-dependent ramp function. In this way, the same advantages are obtained as with the electronic control of the throttle flap. The extent of the closing of the ancillary flap can be fixedly pregiven or be provided as a measure of the throttle flap position or accelerator pedal position.

A comparable procedure results when influencing the drive power via an actuator for controlling the idle rpm in the bypass channel to the main throttle flap or for a control of the drive power via the metering of fuel and/or the ignition point in dependence upon the driver command even when this is undertaken supplementary to the throttle flap control.

Figure 2A:
FIGS. 2A, 2B and 2C show the time-dependent traces of selected signals for explaining the method and arrangement of the invention.
Figure 2B:
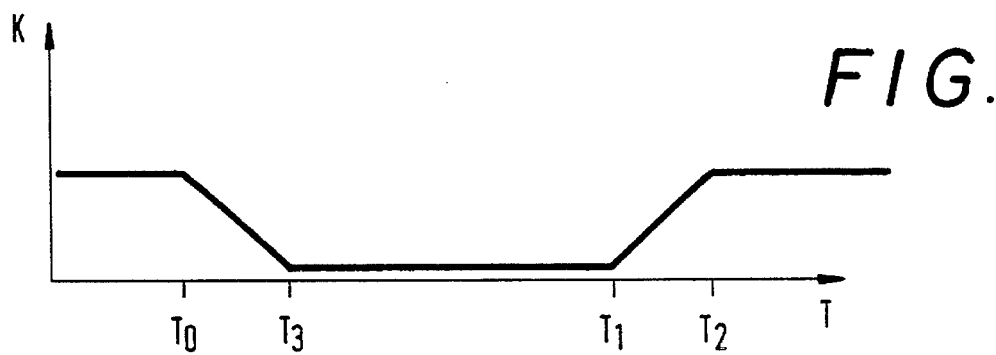
Figure 2C:
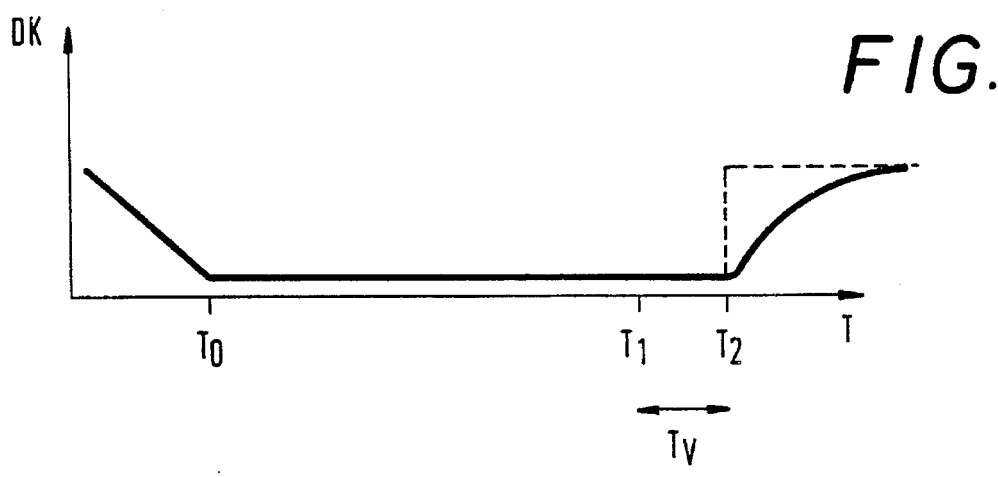

The operation of the invention is shown in FIG. 2 with respect to typical signal traces shown as a function of time. The time is plotted along the horizontal axis in each of FIGS. 2a to 2c. In FIG. 2a, the signal which characterizes the standstill or the slow rolling movement of the motor vehicle is plotted along the vertical axis. In FIG. 2b, the trace of the force connection in the drive train or the trace of the clutch pressure in a selected clutch is shown. In FIG. 2c, the position DK of the throttle flap is plotted along the vertical axis.

At time point $T_0$, the motor vehicle enters the operating state wherein it is at standstill or rolls only slowly which, in accordance with FIG. 2b, leads to a corresponding reduction of the clutch pressure and therefore leads to an interruption of the force connection. At time point $T_0$, the throttle flap is almost in its closed position as shown in FIG. 2c which corresponds to the operating state of standstill or slowly rolling. At time point $T_3$, the force connection is completely interrupted. By actuating the accelerator pedal, a movement out of the operating state of standstill or slowly rolling occurs at time point $T_1$ which is shown in FIG. 2a by a change of levels. This leads to a control of the transmission unit in the sense of reestablishing the force connection by means of a corresponding control of the clutch pressure in the participating clutches (see FIG. 2b). The result is therefore a corresponding change of the signal between the time points $T_1$ and $T_2$ which characterizes the force connection as shown in FIG. 2b. At time point $T_2$, the force connection is again completely reestablished so that at this time point, the throttle flap position changes in the direction of the driver command (shown in FIG. 2c by the broken line). In the time period between $T_1$ and $T_2$, no control of the throttle flap takes place in dependence upon the driver command. A slight change of the throttle flap position in this time interval can be the result of the brake torque of the drive train occurring increasingly by the closure of the clutches. The brake torque is compensated by an idle control to prevent motor standstill.

Figure 3:
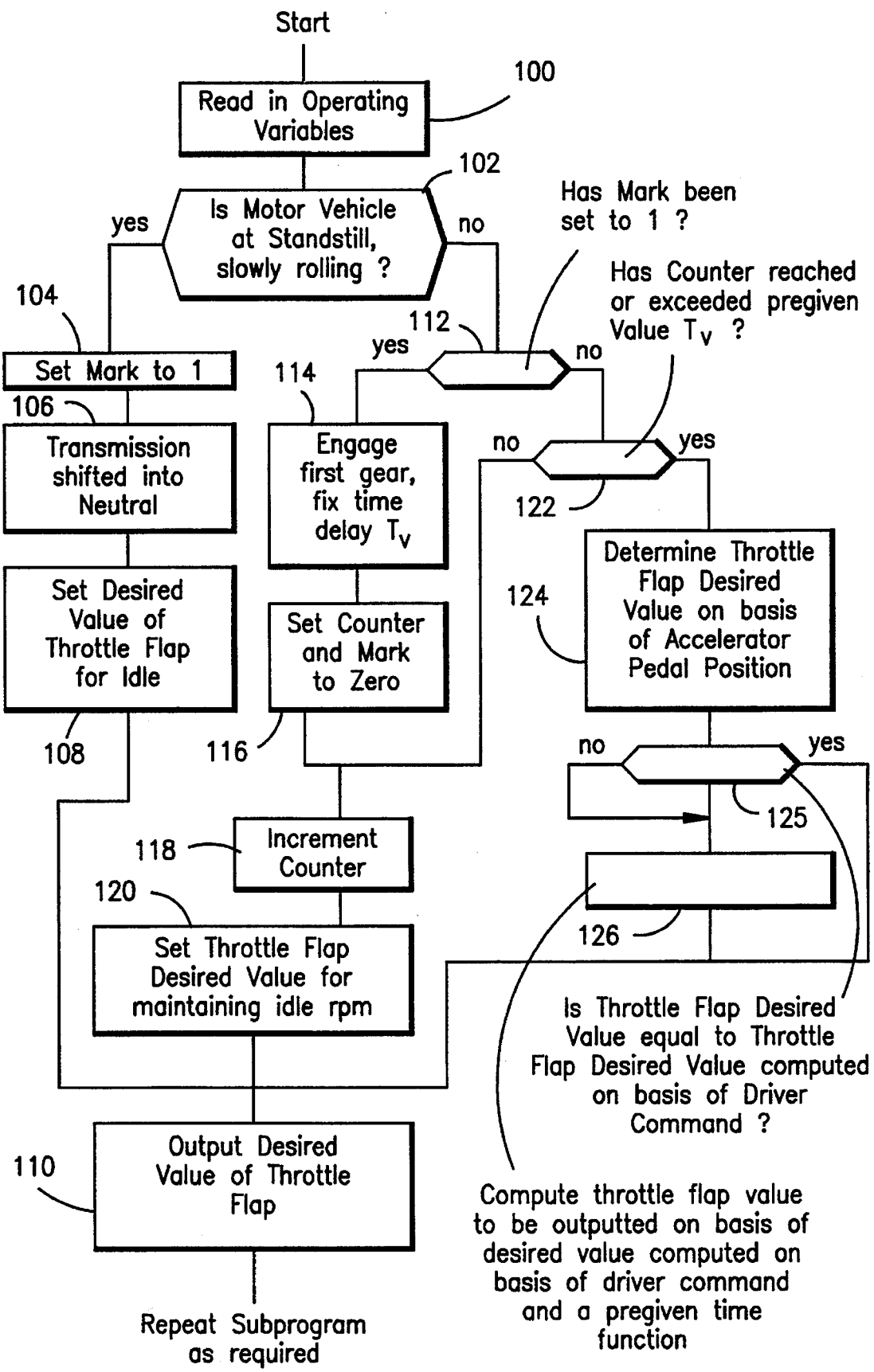
FIG. 3 is a flowchart for explaining a first embodiment of the method of the invention; and, FIG. 4 is a flowchart for explaining a second embodiment of the method of the invention.

In FIG. 3, a flowchart is shown which shows an embodiment of the method of the invention. The method proceeds on the supposition that the motor control and transmission control takes place in one computer element. A corresponding partition of the functions for two or more computer elements is likewise included in this description.

After the subprogram is started, the operating variables needed in the following are read-in in a first step 100, namely: accelerator pedal position, transmission selector lever position, if required brake pedal position, and road speed. In the next step 102, a determination is made as to whether the motor vehicle is in the operating state of standstill or slowly rolling. This determination is made from a released accelerator pedal or an accelerator pedal which is virtually released and a road speed below a pregiven limit value. The actuation of the brake can be considered additionally in another advantageous embodiment of the invention. If the motor vehicle is in this operating state, then a mark is set to 1 in step 104 and in step 106, the transmission is shifted into the neutral position and the force connection is interrupted or a higher gear is engaged. In step 108, the desired value for the throttle flap position is set to the value necessary for controlling the idle rpm and, in step 110, this desired value is outputted. Thereafter, the subprogram is repeated at a pregiven time.

If it is detected in inquiry step 102 that the operating state of standstill or slowly rolling vehicle does not apply, then a check is made in step 112 as to whether the mark has been set to 1. If this is the case, then this is an indication that there is a movement out of this state. This can take place also by checking the accelerator pedal position in step 102 with the actuating operation from the released position of the accelerator pedal being applied as a criterium. If the movement out of the operating state is just then taking place, the first gear (or, in accordance with transmission strategy, another gear) is engaged in accordance with step 114 and the necessary delay time $T_v$ is fixed for carrying out the command of the driver. This delay time $T_v$ can be, for example, pregiven in dependence upon temperature, in dependence upon motor rpm or in dependence upon the transmission ratios of the converter unit with the dead times associated with adjusting the drive power being considered. Thereafter, in step 116, a counter T as well as the mark are set to 0 and, in the following step 118, the counter is incremented. In step 120, the throttle flap desired value is set to the value necessary for maintaining the idle rpm and this desired value is outputted in accordance with step 110. Thereafter, the subprogram is repeated when required.

If the mark is not 1 in accordance with step 112, then in the following inquiry step 122, a check is made as to whether the counter T has reached the pregiven value $T_v$. If this is not the case, then the subprogram is continued with steps 118, 120 and 110 which becomes effective in a delay in carrying out the command of the driver and in maintaining the motor idle rpm.

If in contrast, a determination was made in step 122 that the counter position had reached the value $T_v$ or exceeded the same, then in accordance with step 124, the throttle flap desired value is determined on the basis of the position of the accelerator pedal. If the throttle flap desired value corresponds to this value computed on the basis of the driver command (step 125), then this desired value is outputted in accordance with step 110 and the motor power is adjusted on the basis of the command of the driver. Otherwise, and in accordance with step 126, the throttle flap desired value to be outputted is computed on the basis of the desired value computed on the basis of the driver command and a pregiven time function and outputted in accordance with step 110. This leads to a ramp-shaped increase of the throttle flap position until the throttle flap position is reached which is determined on the basis of the command of the driver.

If a signal indicating the force connection is used as the basis for the control in lieu of the time delay, then steps 116 and 118 can be omitted while a check is made in inquiry step 122 as to whether the signal characterizing the force connection 1s present.

Figure 4:
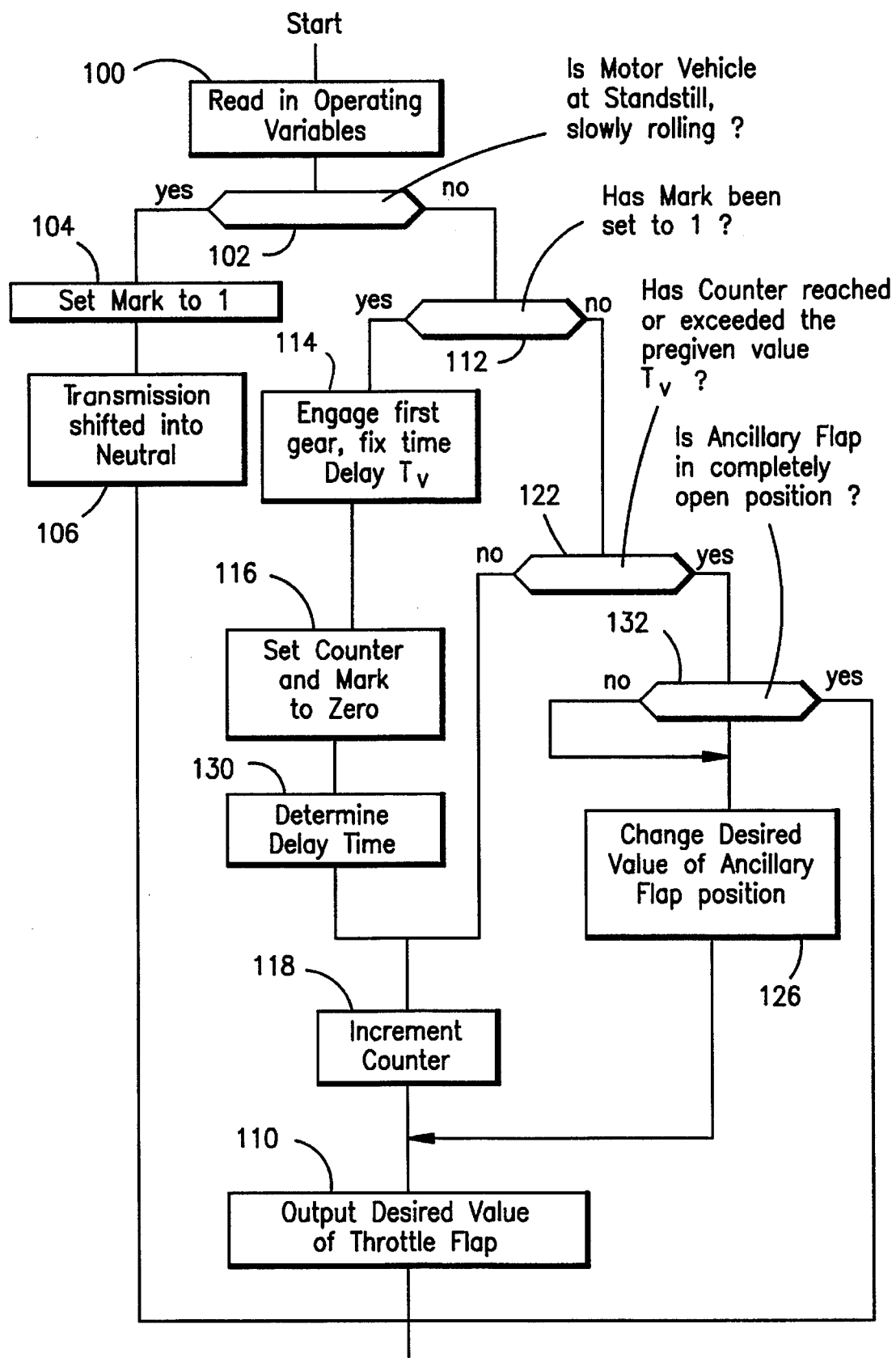

FIG. 4 shows a modified flowchart for the control of an ancillary flap. Here, the steps 100 to 106 are the same for standstill or a slowly rolling vehicle and likewise with steps 110 to 118 and 126. The determination of the throttle flap desired value can be omitted in this operating state. The adjustment of the idle rpm takes place via the idle rpm control. With a movement out of the operating state of standstill or slowly rolling, the delay time is determined in step 130 whereafter the ancillary throttle flap is guided to a throttle flap desired value which is permanently pregiven and is determined, if required, with a view to maintaining the idle rpm. This takes place as rapidly as possible. After the delay time span has elapsed, in step 122 the ancillary flap (if it is not in the completely open position, step 132) is returned slowly to its completely open position by changing the desired value as a function of time according to a ramp function (step 126).

It is understood that the foregoing description is that of the preferred embodiments of the invention and that various changes and modifications may be made thereto without departing from the spirit and scope of the invention as defined in the appended claims.

What is claimed is:

1. A method for controlling the drive power of a drive unit of a motor vehicle, the motor vehicle including: a drive train operatively connected to the drive unit; an operator-controlled element which is actuated by the driver to issue a driver command; detecting means operatively connected to said operator-controlled element for detecting the driver command; control means for controlling the drive power of said drive unit on the basis of the driver command detected by said detecting means; and, adjusting means for adjusting the transmission ratio in said drive train; the method comprising the steps of:

acting on said adjusting means to adjust said transmission ratio to reduce the load on said drive unit when said motor vehicle is in an operating state wherein said motor vehicle is at standstill or slowly rolling;

delaying increasing the drive power of said drive unit notwithstanding said driver command after the motor vehicle has moved out of said operating state into a second operating state wherein the motor vehicle is driven; and, reestablishing said transmission ratio and then increasing said drive power to correspond to said driver command.

2. The method of claim 1, said drive train including an automatic transmission and said method comprising the further step of adjusting said transmission ratio to reduce the tendency of said motor vehicle to slowly roll in said first operating state and/or to reduce the consumption of fuel.

3. The method of claim 2, comprising acting on said adjusting means to shift said automatic transmission into its neutral position to interrupt the force connection in said drive train.

4. The method of claim 3, further comprising increasing said drive power only after a predetermined delay time interval has elapsed.

5. The method of claim 4, said delay time interval being selected to consider dead times, ambient conditions and additional operating variables.

6. The method of claim 5, further comprising the step of completely reestablishing the force connection in said drive train before increasing said drive power.

7. The method of claim 6, further comprising the step of detecting said first operating state on the basis of the position of said operator-controlled element and the road speed of said motor vehicle.

8. The method of claim 7, wherein said operator-controlled element is an accelerator pedal and said motor vehicle including a brake pedal, the method further comprising the step of detecting said operating state by also detecting actuation of said brake pedal.

9. The method of claim 7, further comprising the step of acting on said adjusting means to shift said transmission into a higher gear in said first operating state and then acting on said adjusting means to shift said transmission into a gear lower than said higher gear when said motor vehicle leaves said first operating state to enter said second operating state.

10. The method of claim 9, said gear lower than said higher gear being first gear.

11. The method of claim 9, wherein said control means includes a control unit and a throttle flap operated upon by said operator-controlled element via an electrical circuit path.

12. The method of claim 9, wherein said drive unit is an internal combustion engine having an intake channel and an ancillary flap mounted in said intake channel; and, said ancillary flap being operated upon by said control means via an electrical circuit path.

13. The method of claim 9, further comprising the step of controlling said drive power to said driver command pursuant to a pregiven time function.

14. An arrangement for controlling the drive power of a drive unit of a motor vehicle, the motor vehicle including a drive train operatively connected to the drive unit, the arrangement comprising:
- means for controlling the drive power of said drive unit;
- means for controlling the transmission ratio in said drive train;
- means for detecting an operating state wherein said motor vehicle is at standstill or slowly rolling;
- said means for controlling the transmission ratio including means for adjusting said transmission ratio to effect a reduction of the load on said drive unit in said operating state; and,
- said means for controlling said drive power including means for delaying increasing the drive power of said drive unit after said motor vehicle moves out of said operating state.

* * * * *